No. 610,241. Patented Sept. 6, 1898.
F. S. PEARSON.
COLLECTOR FOR ELECTRIC RAILROADS.
(Application filed Mar. 31, 1897.)

(No Model.)

Witnesses
Geo. Wadman
Chas. Rathjen

Inventor
Fred S. Pearson
by James T. Daw
Attorney

UNITED STATES PATENT OFFICE.

FRED S. PEARSON, OF BOSTON, MASSACHUSETTS.

COLLECTOR FOR ELECTRIC RAILROADS.

SPECIFICATION forming part of Letters Patent No. 610,241, dated September 6, 1898.

Application filed March 31, 1897. Serial No. 630,022. (No model.)

*To all whom it may concern:*

Be it known that I, FRED S. PEARSON, a citizen of the United States, and a resident of Boston, in the county of Suffolk and State of Massachusetts, have invented certain new and useful Improvements in Collectors for Electric Railroads, of which the following is a specification.

My improvement refers to the collectors or plows used with what are known as "underground electric roads," in which the electric conductor is situated in a conduit under the surface of the street.

It sometimes happens in the operations of such roads that the electric conductor in the conduit becomes coated with a thin layer of ice, which interferes with the flow of the electricity from the conductor to the collector and thus to the motor on the cars.

The object of my improvement is to provide a collector which will itself remove the coating of ice from the conductor and permit the free passage of the electricity from the latter.

Figure 1:
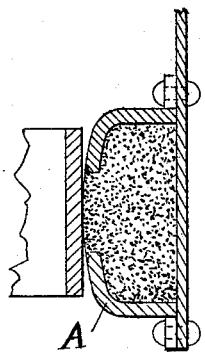
Figure 2:
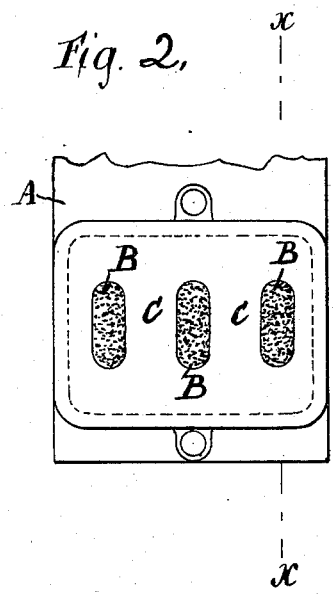

In the accompanying drawings, illustrating my improvement, which shows merely the contact-plate of the collector, Figure 1 is a sectional side view through the line $x\ x$, Fig. 2, of the contact-plate of the collector; and Fig. 2 is a front view of the same.

In my improved collector the ice is removed by being melted or dissolved from the conductor; and the improvement consists, essentially, in inclosing within the contact-plate a suitable ice dissolving or melting substance, as common salt, and allowing the same to come in contact with the conductor as the collector moves along the latter, whereby the ice is removed from the conductor and the electricity permitted to pass into the collector and motor.

In the particular form and construction of my improved device the contact-plate of the collector consists of a box or hollow casing A, capable of being filled with the ice melting or dissolving material. In the front plate of this box or in the side which comes in contact with the conductor are a series of apertures or openings B, through which the dissolving material has access to the conductor. The size and form of these openings will depend upon the particular substance used, it being necessary to allow the material to come in contact with the conductor sufficiently to melt the ice and yet be retained within the casing.

Any suitable melting or dissolving material may be used, as common salt, which can be held in the contact-box in a powdered or solid form, or a liquid may be employed and held in the box by means of a sponge or cotton-waste or in any other manner found desirable. This contact-plate may be used alone on the collector or plow without other plates, in which case it not only melts and removes the ice from the conductor, but collects the electricity on the part of the plate surrounding the apertures, or this plate may be used in connection with other contact-plates on the collector, if desired.

I do not wish to confine myself to the particular form and construction of the improvement herein shown and described, as it is evident that the box or casing A may be varied without departing from the nature of my improvement.

What I claim is—

1. In a collector for electric railroads, in combination, a contact-plate arranged and adapted to convey the electricity from the collector; and an ice-dissolving material carried by the plate whereby the ice is removed from the conductor, substantially as described.

2. In a collector for electric railroads, in combination, the contact-box A having the openings B, arranged and adapted to convey the electricity from the conductor; and an ice-dissolving material carried by the box A whereby the ice is removed from the conductor, substantially as described.

Signed at New York city, in the county of New York and State of New York, this 18th day of March, A. D. 1897.

FRED S. PEARSON.

Witnesses:
LOUIS J. HIRT,
S. A. EMANUEL.